G. P. FINNIGAN.
SYSTEM OF AUTOMATIC TRAIN CONTROL.
APPLICATION FILED OCT. 10, 1911. RENEWED JAN. 11, 1919.
1,305,348.
Patented June 3, 1919.
2 SHEETS—SHEET 1.
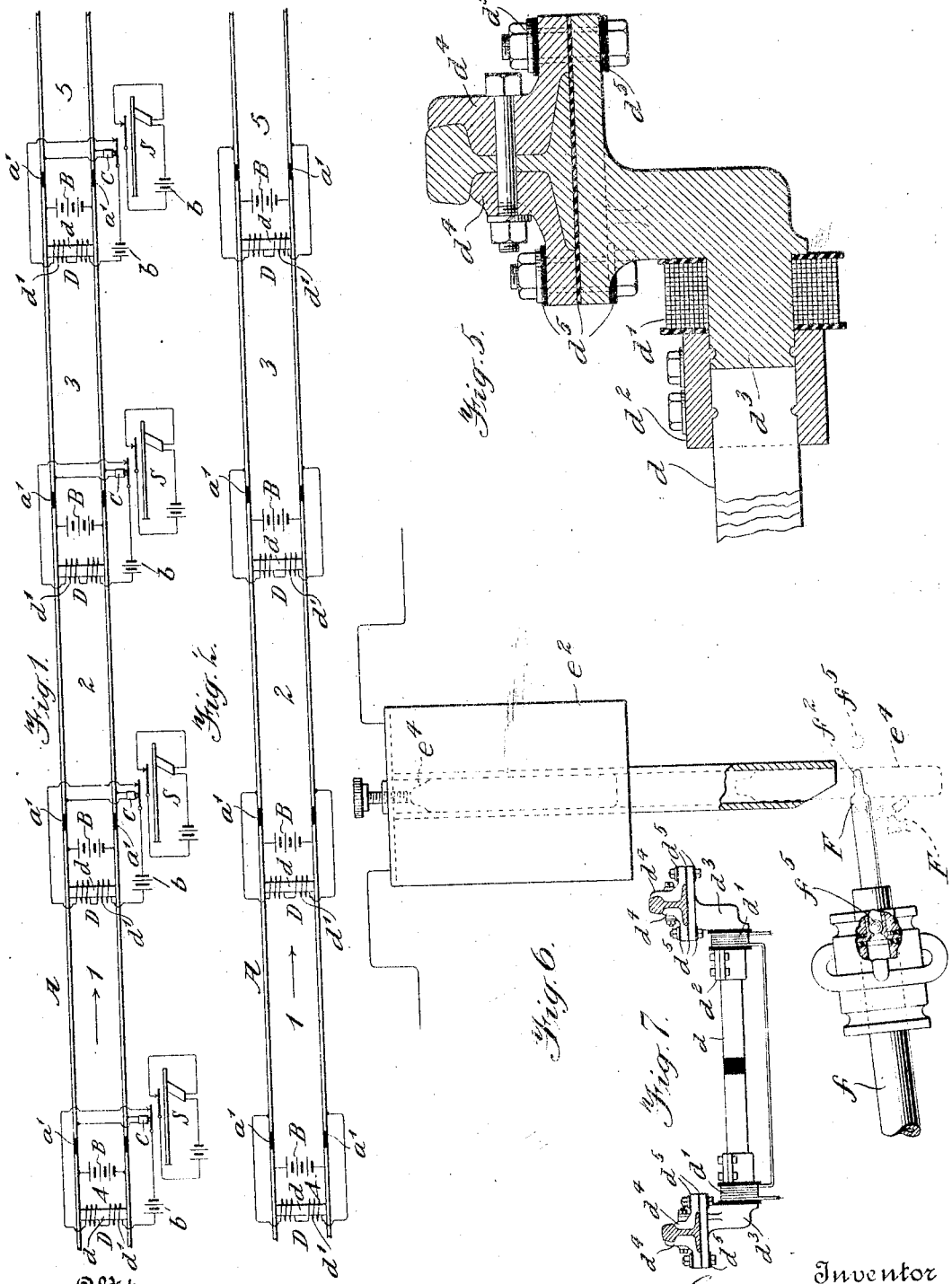

G. P. FINNIGAN.
SYSTEM OF AUTOMATIC TRAIN CONTROL.
APPLICATION FILED OCT. 10, 1911. RENEWED JAN. 11, 1919.
1,305,348.
Patented June 3, 1919.
2 SHEETS—SHEET 2.
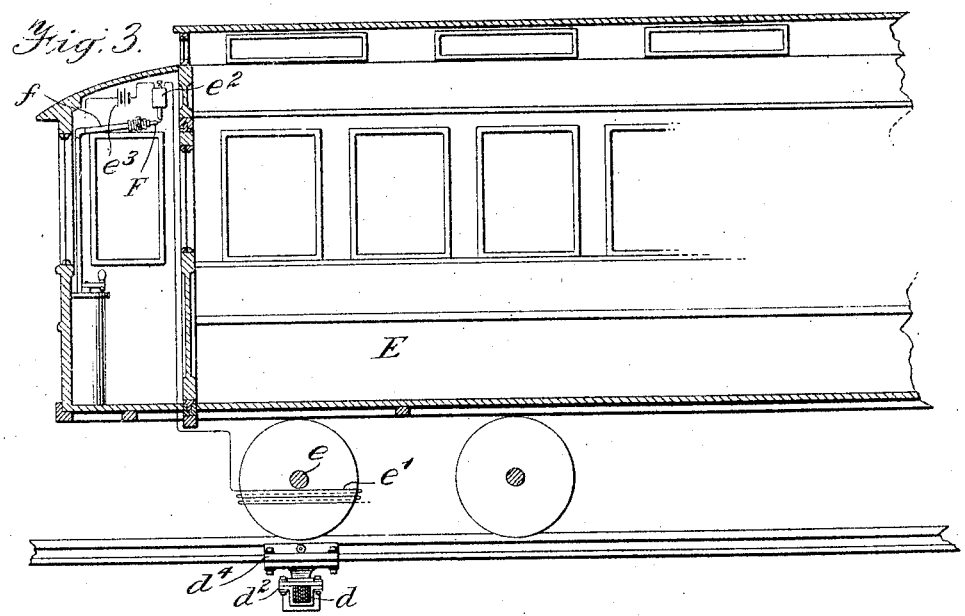
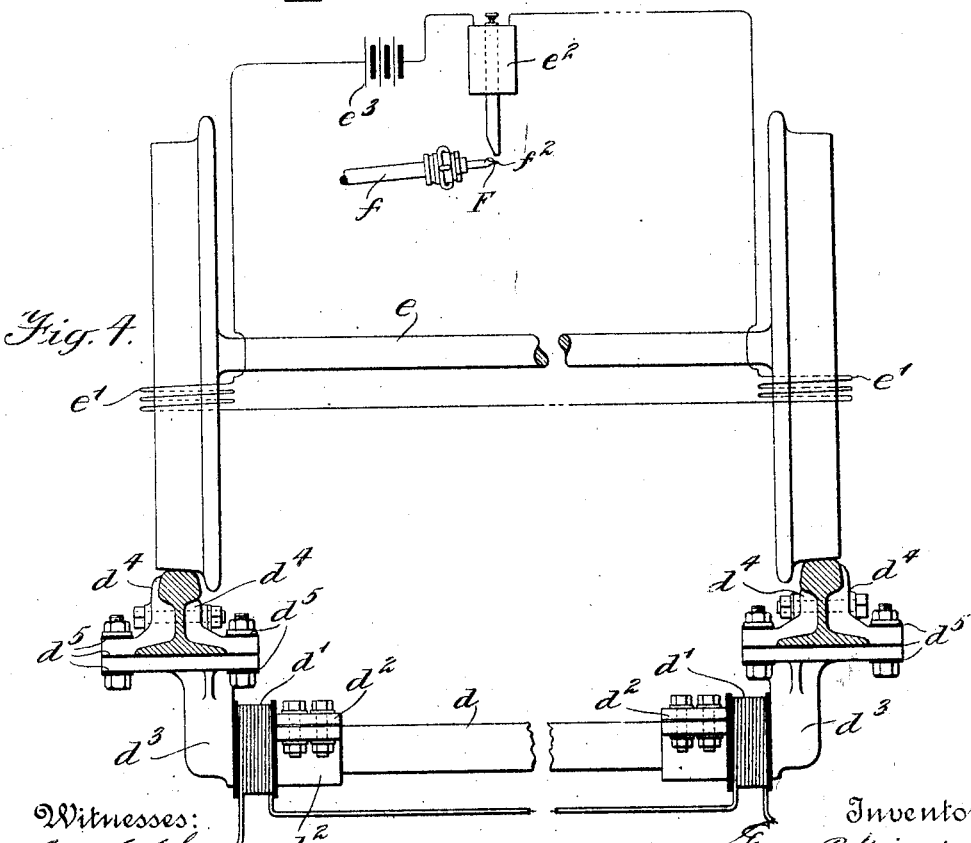

UNITED STATES PATENT OFFICE.

GEORGE P. FINNIGAN, OF WILTON-ON-JAMES, VIRGINIA.

SYSTEM OF AUTOMATIC TRAIN CONTROL.

1,305,348.  Specification of Letters Patent.  Patented June 3, 1919.

Application filed October 10, 1911, Serial No. 653,821. Renewed January 11, 1919. Serial No. 270,753.

*To all whom it may concern:*

Be it known that I, GEORGE P. FINNIGAN, a citizen of the United States, residing at Wilton-on-James, county of Henrico, State of Virginia, have invented certain new and useful Improvements in Systems of Automatic Train Control, of which the following is a specification.

My invention relates to apparatus for controlling the speed of a moving vehicle, as a railway car or train, and relates particularly to apparatus for changing the speed of a vehicle or for bringing it to rest through the agency of means located at intervals along the path of travel of the vehicle.

My invention resides in a system or apparatus of the character referred to in which the moving vehicle carries a circuit including a translating device operating as a signal or a vehicle speed controlling means, which circuit is inductively affected by magnetic flux from a permanent magnet disposed in the path of travel of the vehicle, the flux affecting the vehicle circuit being controlled by an electro-magnet winding adapted to be energized by current in a track circuit, a circuit controlled by a relay which is in turn controlled by a track circuit, or by any other suitable circuit. The electro-magnetic winding or coil is so situated with respect to the permanent magnet that the magneto-motive-force produced by the coil when energized operates upon the magnetic circuit or a part of the magnetic circuit of the permanent magnet so that the effect upon the vehicle circuit under different conditions prevailing in the circuit of the electro-magnetic coil or winding is due to the presence or absence of or change in magnetic flux due to the permanent magnet and the electro-magnetic coil or winding.

My invention resides also in a structure for making a connection of low magnetic reluctance between a rail and a track magnet, which connection may also serve to insulate the rail from the track magnet.

My invention resides further in a permanent magnet upon which is wound the electro-magnetic coil or winding, for the purposes herein described; or in a permanent magnet having a polar extension of soft iron or steel or similar magnetizable material upon which the electro-magnetic winding or coil is disposed, as for purposes herein described.

My invention resides also in further features and the features of arrangement and combination hereinafter described.

For an illustration of some of the forms my invention may take, reference is to be had to the accompanying drawings, in which:

Figure 1 is a diagrammatic view illustrating an automatic block system embodying my invention and in which the track circuits control relays which in turn control the circuits of the electro-magnet coils and visual signals disposed along the path of travel of the train or vehicle.

Fig. 2 is a diagrammatic view of a system similar to that shown in Fig. 1, the electro-magnet windings or coils in this case being connected directly in the track circuits.

Fig. 3 is a view in side elevation of track and vehicle apparatus embodying my invention.

Fig. 4 is a front elevational view, partially in section, and partially diagrammatic of apparatus embodying my invention.

Fig. 5 is a sectional view, some parts in elevation, of a track magnet and its connection to a rail.

Fig. 6 is an elevational view, partly in section, of means for controlling an air brake system.

Fig. 7 is a sectional view, partly in elevation, of a modified structure of track magnet.

Similar letters of reference designate corresponding parts in all of the figures.

Referring now to Fig. 1, A designates a portion of a railway track, the rails of which form parts of closed track circuits. Any desired means may be employed for separating or isolating the closed track circuits from each other, many of which are well known in the art. In Figs. 1 and 2 I have shown in a conventional manner insulated joints $a'$ in the two lines of rails which accomplish the separation of the track circuits from each other, and Figs. 1 and 2 illustrate three (designated 1, 2, 3) such track circuits and portions (designated 4 and 5) of two others. The track between neighboring insulators $a'$ constitutes a block or block section each of which comprises a closed track circuit including a source of energy B at the distant end of the block or block section connected to the rails thereat, the rails of such block or block section and a relay C connected to the rails at the entrance to such block or block section. The source of signaling current may be either direct, alternating, pulsating, or intermittent, and in the drawings I have shown the source of current for each track circuit as being a battery B. The relay device C may also be of any of the well known types, and of course preferably responsive only to the particular signaling current employed in the closed track circuit. In Fig. 2 I have not illustrated a relay in connection with each track circuit, but instead I have included directly in each track circuit a coil or coils employed in connection with a device D to be hereinafter described. The arrangement of Fig. 2 may or may not be used in connection with visual signal devices located alongside the track. In Fig. 1 I have shown the relay of each track circuit not only as controlling the circuit of the coil or coils of a device D associated with the track circuit, but also the circuit of a visual signal device S which may be provided in connection with the device D.

The device D for each track circuit comprises a permanent magnet $d$ whose magnetic flux serves to give a signal or effect a control on a moving vehicle and passes through a magnetic circuit comprising a wheel carried by the moving vehicle, which wheel has preferably a rolling contact with the device D though it may have a sliding contact. The permanent magnet $d$ is preferably made up of sections or laminations (each section or lamination being itself a permanent magnet) so that its magnetic strength may be varied to suit different conditions by the increase or decrease in the number of sections or laminations. In the specific example illustrated in the drawings the permanent magnet $d$ of the device is suitably connected with both track rails, and the connection offers low magnetic reluctance to the magnetic flux (under the required conditions) to the track rails and from them through a wheel or a pair of wheels and their connecting axle carried by a vehicle traveling along the railway. For convenience the pair of wheels and their connecting axle may be one of the several pairs usually provided for the vehicle though additional wheel or wheels may be used.

The device D further comprises one or more coils $d'$, which surround or inclose the permanent magnet $d$ and which act (when energized) to divert or choke back the magnetic flux from the permanent magnet so that the flux from the permanent magnet threading the vehicle circuit is reduced to such degree that its effect thereon is insufficient to effect a signal or a control. The coil or coils $d'$ (in the drawings I have shown two coils) are included in a circuit with a suitable source of current and the circuit may be controlled in any desired way. In Fig. 1 the circuit of the coil including the source of current $b$ is controlled by the armature of the relay device C, while in Fig. 2 the coils $d'$ are included directly in the track circuit. In either of the arrangements shown, a short circuit of the signaling or control current by a car or train on the portions of rails included in a track circuit, or any other interruption of the flow of the signaling or control current in its usual path, results in a deënergization of the coils $d'$.

In the specific example shown in the drawings, the permanent magnet $d$ is connected at its ends by suitable clamps $d^2$ with iron or steel heads $d^3$, (preferably soft iron or steel) and the heads $d^3$ are suitably connected to the rails. The form of connection employed in the drawings comprises two metal plates $d^4$, bolted to the web of the rail and to which the heads $d^3$ are bolted. The purpose of this arrangement is to provide as much metal as possible for the flow of magnetic flux from the permanent magnet to the rails, and also to provide for a rolling contact between one or both of the plates $d^4$ and the wheel or wheels carried by the vehicle with which the device D is to co-act. Suitable insulation $d^5$ is provided between the rails and the device D, or in the device D itself, to prevent the device D acting as a short circuit of the signaling or control current in a track circuit. The necessity for this insulation when my invention is employed in connection with track circuits on railways will be seen from an examination of Figs. 1 and 2. In each of the track circuits the device D is in effect a mass of metal connected to both rails of a track circuit, and unless insulation between it and one or both rails is provided it would act as a short circuit for the signaling or control current and hence make the track circuits ineffective in the system. As seen in Fig. 3, the end of the head or member $d^3$ adjacent the rail and the members $d^4$ extend longitudinally of the rail for a substantial distance, thus increasing the area of these parts adjacent the rail, and thereby making the connection between the magnet and the rail one of low magnetic reluctance. While the coil or coils $d'$ may be placed directly on the permanent magnet $d$ as indicated in Figs. 1 and 2, they are preferably placed upon the members $d^3$. In either arrangement the permanent magnet and the electromagnetic coil or winding $d'$ have so far as regards the rail and the vehicle circuit a magnetic path or magnetic circuit common to both the permanent magnet and the coil.

Each of the devices D, in the example illustrated, is traversed in advance of the block or block section with whose track circuit it coöperates any suitable distance. For example, in Figs. 1 and 2, in which the arrows indicate the direction of travel the device D controlled by track circuit of block or block section 2 is located in the block or block section 1, and the device controlled by the track circuit of block section or block 3 is located in the block or block section 2, and so on.

The moving vehicle to which, or on which, a signal is to be given or a control effected by the permanent magnet $d$ is provided with a wheel or wheels, which are surrounded or inclosed by a coil or coils, which coil or coils are included in a closed circuit with a suitable source of electro-motive force and a translating device. The wheel or wheels carried by the vehicle has preferably a rolling contact with the permanent magnet $d$, either directly or indirectly, so as to be included in and at times form part of the magnetic circuit of the permanent magnet, so that any magnetic flux from the permanent magnet flowing in the said magnetic circuit will induce an electro-motive force in the coil or coils surrounding the wheel or wheels which is availed of to have the translating device effect a control or give a different signal to the driver of the car.

In the specific example illustrated in the drawings I employ a pair of wheels and their connecting axle $e$ of a vehicle E and surround or inclose each wheel, preferably below their connecting axle with a coil $e'$. Two coils $e'$ are suitably supported from the vehicle and are cumulatively connected in a closed circuit carried by the vehicle E, which closed circuit also includes a translating device $e^2$, and a suitable source of electro-motive force $e^3$ here shown as being a battery. Usually the current flowing in this closed circuit from the source $e^3$ operates the translating device $e^2$ to have it give one signal or indication, but when the magnetic flux from the permanent magnet induces an electro-motive force in this circuit through the coil or coils $e'$, this induced electro-motive force is availed of to have the translating device $e^2$ give another and different signal or effect a control. In the drawings the arrangement is such that the induced electro-motive force is counter to the electro-motive force of the source $e^3$ whose normal effect on the translating device $e^2$ is changed and device $e^2$ therefore operates to give another and different signal to effect a control.

The translating device $e^2$ may be of any desired type and may effect any desired signal or control, and I use the term "signal" herein in its broadest sense. In the drawings I have shown the translating device as being a solenoid, the core $c^4$ of which, when the solenoid experiences the induced counter electro-motive force from the permanent magnet, falls onto and breaks a frangible tube F provided in the train pipe comprised in the automatic brake system carried by the vehicle. The breaking of the frangible (glass) tube reduces the air pressure in the train pipe and thus causes an application of the brakes of the vehicle. This is well understood in the art of automatic train stops for cars and trains.

The frangible tube F is connected by a suitable form of coupling with an extension $f$ of the train pipe. As the tube F is closed at one end it forms a seal for the end of the extension. When, however, the tube is broken by the falling core $c^4$ the pressure in the train pipe is reduced and the brakes are automatically applied in a manner well known in the art. I have shown the end $f^2$ of the tube F as being of smaller diameter than the remainder of the tube. Thus the core $c^4$ of the solenoid need only be of a weight sufficient to break the end of the tube and hence with a light weight core in the solenoid the energy from the source of current $e^3$ can be conserved. In order to provide for a quick venting of the train pipe a ball $f^5$ is placed within the tube F, which when the end $f^2$ is broken, is blown outward by the air pressure in the train pipe to completely open the end of the tube. The ball $f^5$ seats itself and is held by gravity (the extension $f$ being slightly inclined to provide for this) against the end of the extension (see Fig. 6). The pressure of air in the extension and frangible tube equalizes itself on both sides of the ball $f$ and thus gravity holds the ball to its seat against the end of the extension.

The operation of the specific arrangement shown in Fig. 1 is as follows:—With no car or train, or a pair of wheels and their connecting axle on the opposite rails of a track circuit, the relay device will close the circuit of the coils of the device D provided for that track circuit. Under these conditions the coil will be effective to divert or choke back the magnetic flux of the permanent magnet from the heads and the rail portions to which they are connected. Thus a vehicle provided with the coils $e'$ can pass over the device D without it affecting the current or electro-motive force of the train circuit. When, however, a car or train bridges the rails of a track circuit, or if for any other reason the signaling current of the track circuit does not flow through the relay device, then the relay device opens the circuit on the coils $d'$ of the track device controlled by it and thus the coils $d'$ are deënergized. Magnetic flux from the permanent magnet then flows through the heads $d^3$ and to the rail portions with which the heads are connected so that when a pair of wheels and their connecting axle bridge the heads, there will be a complete magnetic path or circuit for the magnetic flux from the permanent magnet to flow through it and hence there will be induced in the coils $e'$ surrounding such wheels and their circuit an electro-motive force, which being counter to the electro-motive force of the source in the car circuit will cause the solenoid to release its core and thus produce an application of the brakes.

In order that the driver of the vehicle may have some visual indication of the condition of the devices D, I preferably provide visual signal devices S, one for each device D, and control such signals from the track circuits used in connection with the control of the devices D. When a visual signal device S gives a "clear", "safety" or "proceed" indication, the driver will know that he can safely pass the adjacent device D. Conversely when the visual signal device gives a "danger" or "stop" indication the driver will know that he should not pass the adjacent device D, and that if he attempts to he will be automatically stopped in the manner herein described.

In Fig. 2 the effect of the presence or absence of a vehicle in a block or block section upon a track circuit thereof is the same as that described in connection with Fig. 1 in that when a vehicle is present in a block or block section it short circuits the track circuit of such section, thereby deënergizing the electro-magnet $d'$ located in the section to the rear, so that an approaching train would be stopped by the permanent magnet. Or if there is no train in the block section, the electro-magnet $d'$ is energized and a train in the section or block to the rear may pass over the device D without effect.

It will be understood that my invention may be used with other means of control of the coils of the device D, than with the track circuits.

As another means of protecting or insulating the permanent magnet, I may separate the magnet intermediate its ends as shown in Fig. 7, making in effect two magnets, but yet maintaining a north pole terminal and a south pole terminal adjacent the rails, the same as in the embodiment heretofore described. In this form the insulation for the rails may be omitted.

Having thus described my invention, what I claim as new is—

1. The combination with a vehicle, of a permanent magnet disposed in the path of travel of said vehicle, an electro-magnet associated with said permanent magnet and traversed by said vehicle at the same time said permanent magnet is traversed, a source of energy for energizing said electro-magnet, a closed vehicle circuit, and a translating device in said circuit responsive to electro-motive-force induced therein.

2. The combination with a vehicle traveling along a fixed line of way, a wheel carried thereby, a coil surrounding said wheel, a closed circuit for said coil, a source of electro-motive force and a translating device also included in said circuit, a permanent magnet with which said wheel has traveling contact so as to be included in its magnetic circuit, and means for controlling the flow of magnetic flux from the permanent magnet in said magnetic circuit.

3. The combination with a vehicle traveling along a fixed line of way, a wheel carried thereby, a coil surrounding said wheel, a closed circuit for said coil, a source of electro-motive force and a translating device also included in said circuit, a permanent magnet with which said wheel has traveling contact so as to be included in its magnetic circuit, and electro-magnetic means for controlling the flow of magnetic flux from the permanent magnet in said magnetic circuit.

4. The combination with a vehicle, of a rail of magnetizable material disposed in its path of travel, a permanent magnet, a connection of magnetizable material between said magnet and said rail, a coil on said connection, a source of current for energizing said coil, a vehicle circuit inductively influenced by magnetic flux through said connection, and a translating device in said vehicle circuit.

5. The combination with a permanent magnet, a wheel adapted to have traveling contact therewith so as to form part of its magnetic circuit, a coil surrounding said wheel, a closed circuit including said coil, a translating device also included in said circuit and adapted to be operated by the electro-motive force induced in it by the magnetic flux from said permanent magnet, and means for controlling the flow of magnetic flux from said permanent magnet.

6. The combination with a permanent magnet, a wheel adapted to have traveling contact therewith so as to form part of its magnetic circuit, a coil surrounding said wheel, a closed circuit including said coil, a translating device also included in said circuit and adapted to be operated by the electro-motive force induced in it by the magnetic flux from said permanent magnet, and means comprising a coil and a source of current for controlling the flow of magnetic flux from said permanent magnet.

7. The combination with a permanent magnet located in a trackway and connected with the opposite rails so as to have the rails included in the magnetic circuit of the permanent magnet, a coil on the magnetic circuit of said permanent magnet for diverting or choking the flow of flux from the permanent magnet from the track rails when it is energized, a circuit and source of current including said coil, means for controlling said circuit whereby the coil may be energized or deënergized, a wheel having traveling contact with said trackway, a coil surrounding said wheel, and a closed circuit including said coil.

8. The combination with a permanent magnet located in a trackway and connected with the opposite rails so as to have the rails included in the magnetic circuit of the permanent magnet, a coil on the magnetic circuit of said permanent magnet for diverting or choking the flow of flux from the permanent magnet from the track rails when it is energized, a circuit and source of current including said coil, means for controlling said circuit whereby the coil may be energized or deënergized, a wheel having traveling contact with said trackway, a coil surrounding said wheel, a closed circuit including said coil, a source of electro-motive force in said circuit, and a translating device controlled by said circuit.

9. The combination with a permanent magnet located in a trackway and connected with the opposite rails so as to have the rails included in the magnetic circuit of the permanent magnet, a coil on the magnetic circuit of said permanent magnet for diverting or choking the flow of flux from the permanent magnet from the track rails when it is energized, a circuit and source of current including said coil, means for controlling said circuit, a wheel having traveling contact with said trackway, a coil surrounding said wheel, a closed circuit including said coil, and a translating device controlled by said wheel coil circuit.

10. The combination with a permanent magnet located in a trackway and connected with the opposite rails so as to have the rails included in the magnetic circuit of the permanent magnet, a coil on the magnetic circuit of said permanent magnet for diverting or choking the flow of flux from the permanent magnet from the track rails when it is energized, a circuit and source of current including said coil, a closed track circuit for controlling said circuit, a wheel having traveling contact with said trackway, a coil surrounding said wheel, a closed circuit including said coil, and a translating device controlled by said wheel coil circuit.

11. The combination of the opposite lines of rails of a railway, a permanent magnet, means for magnetically connecting said permanent magnet with the track rails, a coil or coils surrounding portions of the permanent magnet for diverting or choking back the magnetic flux of the permanent magnet from the rails, a coil carried by a vehicle traveling along the railway and affected by the flux from the permanent magnet, and a signaling device included in a circuit with said coil and affected by magnetic flux from said permanent magnet in the said coil.

12. The combination with a vehicle, of a rail of magnetizable material disposed in its path of travel, a permanent magnet, a connection of magnetizable material between said magnet and said rail, a coil on said connection, a source of current for energizing said coil, a vehicle circuit inductively influenced by magnetic flux through said connection, a translating device in said vehicle circuit, a track circuit including said rail and said source of current, and means insulating said connection from said rail.

13. The combination with a permanent magnet, coils and a source of energy for producing a counter magnetism in said permanent magnet, a wheel adapted to have traveling contact with the permanent magnet so as to form part of its magnetic circuit, a coil surrounding said wheel, a closed circuit including said coil, and a translating device also included in said circuit.

14. The combination with a vehicle, of a pair of track rails, vehicle wheels traveling on said rails, a permanent magnet disposed in the trackway and having a magnetic connection with said rails, a coil on the magnetic circuit of said permanent magnet, a track circuit including said rails, said coil and a source of energy, means preventing short circuit of said track circuit through said magnet, a vehicle circuit adapted to be inductively influenced by said magnet, and a translating device in said vehicle circuit.

15. The combination with a vehicle traveling along a fixed line of way, a wheel carried thereby, a coil surrounding said wheel, a closed circuit for said coil, a source of electro-motive force and a translating device also included in said circuit, a permanent magnet located in the line of way for coaction with the coil and its closed circuit, and means for controlling the flow of magnetic flux from the permanent magnet.

16. The combination with a rail, of a magnet, and a low reluctance connection between said magnet and said rail comprising a magnet head and magnetizable members embracing said rail, said head and members extending a substantial distance along said rail to increase the coöperative areas of said rail, head and members.

17. The combination with a vehicle movable along a fixed line of way, a wheel carried thereby, a coil surrounding said wheel, a closed circuit for said coil, a translating device, a source of electro-motive force in connection with said coil, to hold said translating device in said definite position, a permanent magnet with which said wheel has traveling contact so as to be included in its magnetic circuit, and an electromagnetic means for controlling the magnetic flux from the permanent magnet, said circuit adapted to be inductively affected by said magnet.

18. The combination with a moving vehicle, of a track circuit, a permanent magnet in the path of travel of said vehicle, an electro-magnetic coil and a source of energy controlled by said track circuit, said electro-magnetic coil and said permanent magnet being traversed simultaneously by said vehicle, a vehicle circuit adapted to be inductively affected, and a translating device in said vehicle circuit.

19. The combination with a plurality of block sections each comprising a normally closed track circuit, of a vehicle adapted to pass over said block sections, a closed vehicle circuit, a translating device in said vehicle circuit responsive to electro-motive-force induced therein, a permanent magnet disposed in advance of the entrance to each block section, and a coil on the magnetic circuit of said magnet controlled by the track circuit of the block section in advance and normally opposing said permanent magnet.

20. The combination with a moving vehicle, of a closed circuit thereon, a source of energy and a solenoid connected in said circuit, said solenoid normally energized by said source of energy to hold its core against gravity, means for producing a magnetic field disposed in the path of travel of said vehicle for inducing in said vehicle circuit electro-motive-force whereby said solenoid is deënergized and said core drops, and controlling means responsive to the impact of said core.

21. The combination with a moving vehicle, of a closed circuit thereon, a source of energy and a solenoid connected in said circuit, said solenoid normally energized by said source of energy to hold its core against gravity, means for producing a magnetic field disposed in the path of travel of said vehicle for inductively affecting said vehicle circuit, and a member closing the control pipe of an air-brake system on said vehicle, said solenoid core being released to actuate said member to open said pipe upon induction in said vehicle circuit of an electro-motive-force opposing said source of energy.

22. The combination with a moving vehicle, of a closed circuit thereon, a source of energy and a solenoid connected in said circuit, said solenoid normally energized by said source of energy to hold its core against gravity, means for producing a magnetic field disposed in the path of travel of said vehicle for inductively affecting said vehicle circuit, a member closing the control pipe of an air-brake system on said vehicle, said solenoid core being released to actuate said member to open said pipe upon induction in said vehicle circuit of an electro-motive-force opposing said source of energy, said means for producing a magnetic field comprising a permanent magnet, and a flux controlling coil upon said permanent magnet.

23. The combination with a moving vehicle, of a rail of magnetizable material, a permanent magnet, a head of magnetizable material on said permanent magnet and disposed in proximity to said rail for magnetizing the same, a flux controlling coil on said head, a vehicle circuit adapted to be inductively influenced by the flux in said rail, and a translating device in said vehicle circuit.

24. The combination with a moving vehicle, of a permanent magnet disposed in its path of travel, a head of magnetizable material on said permanent magnet, a flux controlling coil on said head, a vehicle circuit inductively affected by magnetic flux, and a translating device in said vehicle circuit.

25. The combination with a vehicle, of rails of magnetizable material, vehicle wheels of magnetizable material traveling on said rails, a permanent magnet, connections between said rails and the poles of said magnet, flux controlling coils on said connections, said wheels forming part of the magnetic circuit of said magnet and coils when traversing the same, a vehicle circuit inductively influenced by changes of magnetic flux in said wheels, and a translating device controlled by said vehicle circuit.

26. The combination with a vehicle, of a rail, a member of magnetizable material movable with said vehicle in contact with said rail, a permanent magnet, a pole piece therefor for conducting flux to said member, a flux controlling coil on said pole piece, a vehicle circuit inductively influenced by change of magnetic flux in said member, and a translating device controlled by said circuit.

27. The combination with a vehicle, of a circuit thereon, a winding in said circuit, a translating device controlled by said circuit, a permanent magnet in the path of travel of said vehicle, the magnetic circuit of said magnet completed through said winding when said vehicle passes said magnet, and an electro-magnet having a similar magnetic circuit common with the magnetic circuit of said permanent magnet.

28. The combination with a vehicle, of a closed circuit thereon, sources of magneto-motive-force disposed in the path of travel of said vehicle for inductively influencing said circuit through the same magnetic path and opposing each other in their effect upon said circuit, and means for changing the magnitude of one of said magneto-motive-forces.

29. The combination with a vehicle, of a circuit thereon, a permanent magnet in the path of travel of said vehicle for inductively influencing said circuit, a coincident electro-magnet normally energized and opposing said permanent magnet, and means for de-energizing said electro-magnet in response to a traffic condition of the path of travel of said vehicle.

30. The combination with a vehicle, of a closed circuit thereon, and coincident permanent and electro-magnets in the path of travel of said vehicle for determining the quantity of magnetic flux threading said circuit, said circuit inductively influenced by one of said magnets.

31. The combination with a vehicle, of a closed circuit thereon, and coincident permanent and electro-magnets in the path of travel of said vehicle for determining the quantity of magnetic flux threading said circuit, said electro-magnet opposing said permanent magnet, said circuit inductively influenced by one of said magnets.

32. The combination with a vehicle, of coincident permanent and electro-magnets and a circuit movable with respect thereto constituting relatively movable elements, one of said elements movable with said vehicle and the other disposed in the path of travel of said vehicle, said magnets determining the quantity of flux threading said circuit.

In witness whereof I have hereunto signed my name in the presence of two subscribing witnesses.

GEORGE P. FINNIGAN.

Witnesses:
M. E. McNinch,
C. G. Heylmur.